(12) United States Patent
Baranowski et al.

(10) Patent No.: US 9,734,247 B2
(45) Date of Patent: Aug. 15, 2017

(54) TOPOLOGY SERVICE USING CLOSURE TABLES AND METAGRAPHS

(71) Applicant: Amazon Technologies, Inc., Seattle, WA (US)

(72) Inventors: Matthew Paul Baranowski, Seattle, WA (US); Jacob Adam Gabrielson, Seattle, WA (US); Vijayaraghavan Apparsundaram, Amherst, MA (US)

(73) Assignee: Amazon Technologies, Inc., Reno, NV (US)

( * ) Notice: Subject to any disclaimer, the term of this patent is extended or adjusted under 35 U.S.C. 154(b) by 95 days.

(21) Appl. No.: 14/715,297

(22) Filed: May 18, 2015

(65) Prior Publication Data

US 2015/0248487 A1 Sep. 3, 2015

Related U.S. Application Data

(63) Continuation of application No. 13/795,508, filed on Mar. 12, 2013, now Pat. No. 9,037,571.

(51) Int. Cl.
*G06F 17/00* (2006.01)
*G06F 17/30* (2006.01)
*H04L 12/24* (2006.01)

(52) U.S. Cl.
CPC .. *G06F 17/30864* (2013.01); *G06F 17/30442* (2013.01); *G06F 17/30958* (2013.01); *H04L 41/024* (2013.01); *H04L 41/12* (2013.01); *H04L 41/0893* (2013.01); *H04L 41/22* (2013.01); *H04L 41/5096* (2013.01)

(58) Field of Classification Search
CPC ........ G06F 9/546; G06F 13/4022; G06F 9/54; G06F 11/1604; G06F 11/3495; G06F 13/4282
See application file for complete search history.

(56) References Cited

U.S. PATENT DOCUMENTS

2006/0036633 A1* 2/2006 Chong .............. G06F 17/30734
2012/0254254 A1 10/2012 Milousheff

OTHER PUBLICATIONS

Bill KaiWin "SQL Antipatterns Strike Back", Apr. 20, 2009, pp. 1-250.
Bill Karwin, "Rendering Trees with Closure Tables" Mar. 24, 2010, Downloaded from karwin.blogspotcom/2010/03/rendering-trees-with-closure-tables.html on Mar. 12, 2013, pp. 1-14.
U.S. Appl. No. 13/795,508, filed Mar. 12, 2013, Matthew Paul Baranowski, et al.

* cited by examiner

*Primary Examiner* — Truong Vo
(74) *Attorney, Agent, or Firm* — Robert C. Kowert; Meyertons, Hood, Kivlin, Kowert & Goetzel, P.C.

(57) ABSTRACT

Methods and systems for a topology service providing an interface for specifying a topology and answering queries regarding the topology. Further, the topology service may create, from a specified topology, a directed acyclic graph and corresponding closure table. The topology service may also provide an interface for receiving metadata regarding the topology. In this way, the topology service, based at least in part on connections between nodes in the entries of the closure table and based at least in part on the metadata regarding the topology, may answer queries in regard to the specified topology.

20 Claims, 11 Drawing Sheets

| Ancestor | Descendent |
|---|---|
| Server 102 | Rack 112 |
| Server 102 | Rack PDU 116 |
| Server 104 | Rack 112 |
| Server 104 | Rack PDU 116 |
| Server 108 | Rack 114 |
| Server 108 | Rack PDU 116 |
| Server 110 | Rack 114 |
| Server 110 | Rack PDU 116 |
| Rack 112 | Rack PDU 116 |
| Rack 114 | Rack PDU 116 |
| | |
| | |

- 152
- 154
- 156
- 158
- 160
- 162
- 164
- 166
- 168
- 170

Closure Table 150

FIG. 1C

```
SELECT
    building.node_name, COUNT(topology.*)

FROM
    topology_example AS topology,
    node_example AS host,
    node_example AS building, WHERE
    topology.descendent_node_id = host.id AND
    topology.ancestor_node_id = building.id AND
    host.node_type = "HOST" AND
    building.node_type = "BUILDING"

GROUP BY
    building.node_name;
```

Query 700

TOPOLOGY SERVICE USING CLOSURE TABLES AND METAGRAPHS

This application is a continuation of U.S. patent application Ser. No. 13/795,508, filed Mar. 12, 2013, now U.S. Pat. No. 9,037,571, which is hereby incorporated by reference in its entirety.

BACKGROUND

A topology of system may often be characterized as a directed acyclic graph of the elements that compose the system. In other words, the topology of a system may describe the types of elements, or nodes, within the system and connections between the elements, or nodes, within the system. Further, it may often be the case that information regarding the topology of a system may be a subject of inquiry for a user or manager of the system. In such cases, how the topology is represented and stored may affect the speed with which queries about the topology may be answered. Further, the manner in which the topology is represented and stored may determine whether or not some types of queries may be answered at all. Traditionally, adjacency lists have been used in representing various kinds of topologies; however, adjacency list based topology representation may suffer from performance and query restrictions.

BRIEF DESCRIPTION OF THE DRAWINGS

FIG. 1C illustrates a closure table corresponding to a directed acyclic graph, according to some embodiments.

DETAILED DESCRIPTION OF EMBODIMENTS

Various embodiments of systems and methods are disclosed for implementing a topology service capable of building closure table representations of a topology of nodes and answering queries regarding the topology, where the topology corresponds to a directed acyclic graph.

In some embodiments, the topology service may provide answers to topology queries based at least in part on a representation of a topology as a closure table and based at least in part on a metagraph representing relationships or rules among the nodes of the topology. Further, the topology service is able to flexibly cope with changes in topologies and to represent arbitrary topologies.

Figure 1A:
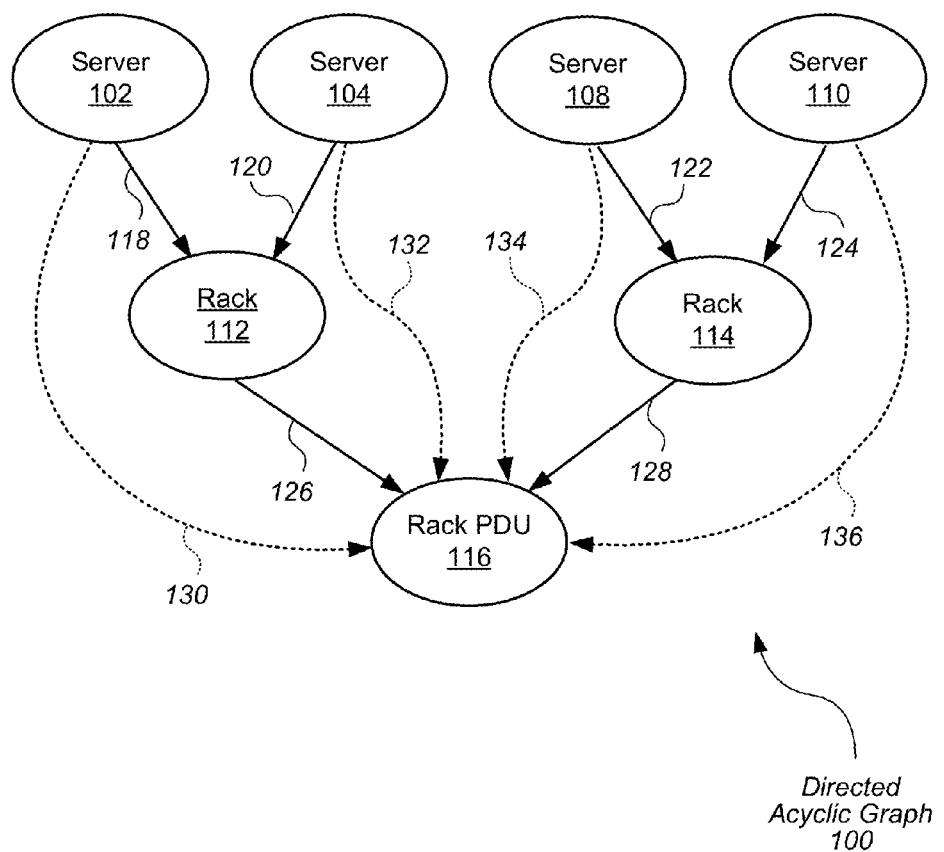
FIG. 1A illustrates a directed acyclic graph corresponding to a particular topology, according to some embodiments.
Figure 1B:
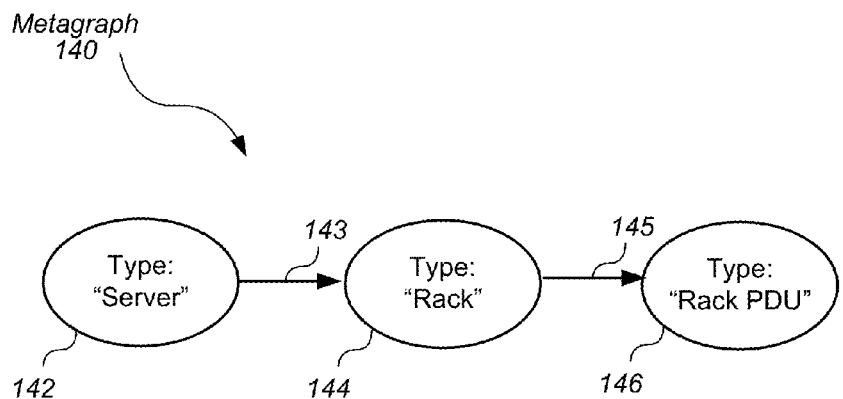
FIG. 1B illustrates a metagraph corresponding to a particular topology, according to some embodiments.
Figure 1D:
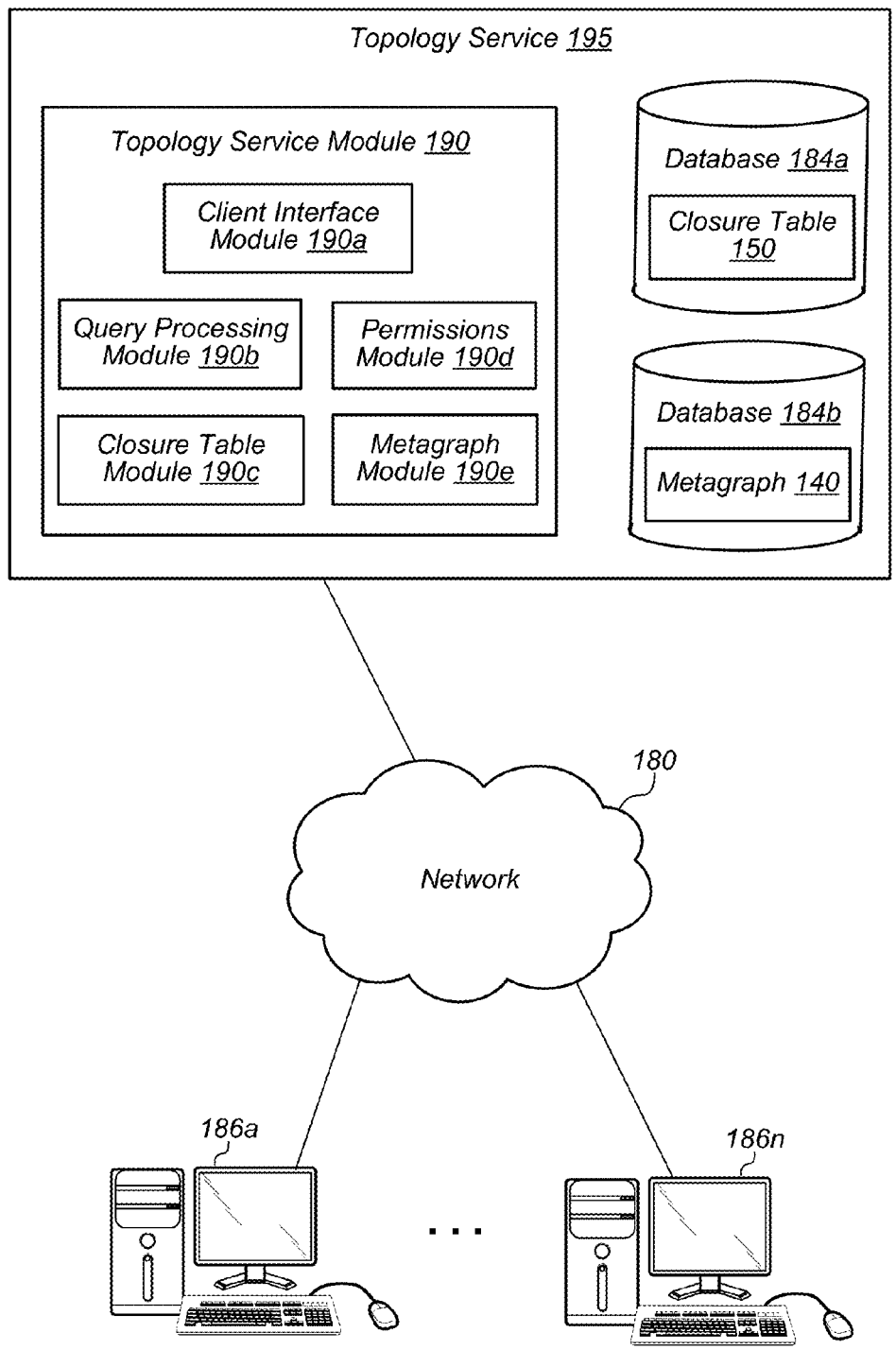
FIG. 1D illustrates a computing environment in which embodiments of a topology service may be implemented.

An example embodiment of a topology service 195 is illustrated in FIG. 1D, where a user may be working at a computer system 186a to communicate with the topology service over a network 180.

For a given topology, a person may be interested to know that given nodes or elements within, for example, a data center are connected in particular ways. In this example, a data center may be configured such that a building includes rack power distribution units (rack PDUs), where a rack PDU may include one or more racks, and where a rack may include one or more servers, among other potential devices.

A closure table may be a representation of a topology such that a record exists for every node in a graph that is connected to another node in the graph, either directly or transitively. For example, given a simple graph of: A→B→C, the closure table would have records for direct connections {A, B}, {B, C}, and also the transitive connection between A and C of {A, C}.

In other words, in this example, in addition to the existing edges of the graph, {A, B} and {B, C}, there is the additional edge, {A, C}, where C is transitively reachable from A. In this way, a path is recorded from each given node to each descendent of the given node, and in some cases, a node may be considered to connect to itself.

By contrast, an adjacency list would have a number of records equal to the number of edges, in this example two records, {A, B} and {B, C}, but not {A, C} since A and C are not adjacent. While it may be the case that a closure table stores a greater amount of data for a given graph, many types of queries may be answered much more quickly using a closure table than an adjacency list. Further, many queries answered using a closure table may be answered non-recursively.

Further, the configuration or topology of the data center, or portions of the configuration or topology of the data center may be represented as a directed acyclic graph, such as the directed acyclic graph 100 in FIG. 1A. In general, a directed acyclic graph may represent any abstract or physical configuration of elements, where one or more elements may be logically or physically connected to each other. In this example, the direction of an arrow indicates a relationship of being-included-within. In other words, in FIG. 1A, servers 102 and 104 are included within rack 112, servers 108 and 110 are included within rack 114, and racks 112 and 114 are included within rack PDU 116.

In other directed acyclic graphs, the direction of an arrow may indicate different types of relationships and there may be multiple relationships represented within a given directed acyclic graph. Further, and generally, it may be the case that a given node in a directed acyclic graph may have any number of incoming arrows and any number of outgoing arrows. In short, so long as no given node may reach itself following a sequence of edges through the graph while respecting the direction of the edges, a graph may be considered to be acyclic.

While a given directed acyclic graph may fully or partially represent connections between the nodes of a system, it may often be the case that a query regarding the topology of the system depends on more than simply existing connections. For example, given directed acyclic graph 100 in FIG. 1A, while there may be no connection between server 110 and rack PDU 116, considering the direct connections alone in directed acyclic graph would be insufficient to answer a question as to whether such a connection is permissible or makes logical sense. In other words, simply because this directed acyclic graph does not have a connection between server 110 and rack PDU 116 provides no information as to whether such a connection can be added.

Therefore, to represent the permissible connections or relationships or to represent the restricted connections or relationships, among other types of information, a metagraph may be defined to correspond to a given acyclic graph, where the metagraph represents allowable configurations or relationships within the topology, where the existing topology is represented with the directed acyclic graph.

For example, a metagraph may identify a type or characteristics of server 110 and a type or characteristics of rack PDU 116. In other words, a metagraph may describe the rules of a graph. One depiction of a simple metagraph corresponding to some aspects a data center is illustrated as metagraph 140 in FIG. 1B, where the metagraph specifies that servers, or nodes of type "server", may be connected and included within racks, or nodes of type "rack", and racks may be connected and included within rack PDUs, or nodes of type "rack PDU".

In some embodiments, connections that do not exist between nodes of a given type may be interpreted as not being allowed, and in this example, such an interpretation of metagraph 140 would indicate that servers are not allowed to be directed connected to rack PDUs. Further in this example, the direction of the edges is also informative in that interpreting the direction of edge 143 between nodes 142 and 144 would indicate that servers may be included within racks, but that racks may not be included within servers. Similarly, edge 145 between nodes 144 and 146 would indicate that racks may be included within rack PDUs, but that rack PDUs may not be included within racks.

In other words, in addition to identifying types or characteristics for particular nodes, the metagraph may also store information as to whether an element or node of type X may be connected to an element or node of type Y, where the connection may be indicative of a relationship between the node of type X and the node of type Y. In this example, if type X is a server and type Y is a rack PDU, the metagraph may store information indicating that a server may not be directly connected to a rack PDU, if this particular restriction has been defined to be true within the data center.

In general, a metagraph may specify any allowable relationship or restriction or rule among the elements of a topology as represented with a directed acyclic graph. For example, the metagraph may indicate that no more than five servers may be within any given rack, or that no more than three servers may be within a specific kind of rack. In another example, the metagraph may represent condition restrictions, such as a given connection or relationship being permissible only under certain conditions. Further, in some cases, a metagraph update may result in certain topologies no longer being allowed, and in the case of existing topologies, the topology service may detect a no longer allowed connection and notify a user.

DETAILED DESCRIPTION CONSIDERATIONS

Within the detailed description, numerous details are set forth to provide a thorough understanding of the claimed subject matter. However, it will be understood by those skilled in the art that the claimed subject matter may be practiced without these specific details. In other instances, methods, apparatus or systems that would be known by one of ordinary skill have not been described in detail so as not to obscure claimed subject matter.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

As used herein, the terms "first", "second", and so on are used as labels for nouns that they precede, and do not imply any type of ordering (e.g., spatial, temporal, logical, etc.). For example, in a display environment having multiple display devices, the terms "first" and "second" display devices can be used to refer to any two of the multiple display devices. In other words, the "first" and "second" display devices are not limited to logical display devices 0 and 1.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to".

Example Embodiment of a Topology Service

Turning now toward specific embodiments of a topology service, a further discussion is provided of an example topology and topology service, as represented with directed acyclic graph 100 in FIG. 1A corresponding to a particular topology, a corresponding metagraph 140 in FIG. 1B, and a corresponding closure table 150 in FIG. 1C for the topology, where these elements are presented within the context of an example embodiment in FIG. 1D.

In general, the topology service may be implemented on any computer system, where the topology service may provide an interface, either a user interface or an application programming interface, and support for creating topologies, modifying topologies, building metagraphs in regard to various topologies, and querying a data store regarding a particular topology or topologies.

Specifically, as illustrated within FIG. 1D, a topology service module 190 may include various modules for implementing a topology service 195, which may be accessed over a network 180 from one or more users at various computer systems, such as 186a through 186n. For example, Client Interface Module 190a may be configured to provide an interface through which the functionality of the topology service may be engaged. Closure Table Module 190c may be configured to create a closure table that corresponds to a specific topology as inputted from a user. Metagraph Module 190e may be configured to create a metagraph, to use a metagraph for validating topologies inputted from a user, or to use a metagraph in answering queries. Query Processing Module 190b may be configured to receive and generate responses to queries of the topology. Permissions Module 190d may be configured to ensure that queries, or topology modifications, or any other topology service conforms to user permissions of a particular user. Databases 184a and 184b may store data used by the topology service, including closure table 150 and metagraph 140. Each of these elements of a topology service is discussed further below.

Other configurations for implementing a topology service are possible. For example, a topology service may be implemented within a virtual computing environment, which may in turn include virtual computing instances. Further, the topology service may communicate with any kind of database or data store, where a given database or data store may be local or remotely accessible. In other words, the closure tables and metagraphs may be stored locally on the system implementing the topology service.

In the context of a data center, a user may use the topology service to create a topology corresponding to directed acyclic graph 100 in FIG. 1A. For example, the topology service may provide a user interface through which the user may specify nodes and connections between nodes in specifying the topology. Any number of methods for receiving input corresponding to a specification of a particular topology may be supported. For example, uploading a file of adjacency list pairs of nodes, or a user using a visual interface to lay out nodes and their connections.

In this example, the user may specify pairs of connected nodes, such as a specific server connected to, and included within, a specific rack. When all of these specified connections are considered in the aggregate, they represent a topology. However, so long as the input, in whatever format it takes, describes a particular topology, the topology service may create a representation of the topology. Receiving these inputs from the user in specifying a topology is illustrated at 202 of FIG. 2A.

In some embodiments, the topology service may detect cycles within the specified connections between nodes, and provide a warning of the detected cycle. In other examples, metadata, such as metadata within a metagraph, for the corresponding topology may be accessed to determine whether or not a particular connection between the types of the nodes specified as a pair is allowable.

For the sake of this example, if the topology service were to receive input specifying a server connected to a rack PDU, using metagraph 140, the topology service would determine that no such direct connection was permissible between servers and rack PDUs because no such direct link exists in the metagraph. Therefore, in this example, the topology service would indicate that this particular specification of a pair of nodes between a server and a rack PDU was not allowable.

In directed acyclic graph 100, each of nodes 102, 104, 108, 110, 112, 114, and 116, and each of directed edges 118, 120, 122, 124, 126, and 128 may have been entered from a user using an interface of the topology service in creating an initial topology of a data center. These initial specifications, after determining they are allowable, may be stored within a closure table. The topology service may then, based on the specified connections between nodes, generate and store the remaining records in the closure table.

Figure 2A:
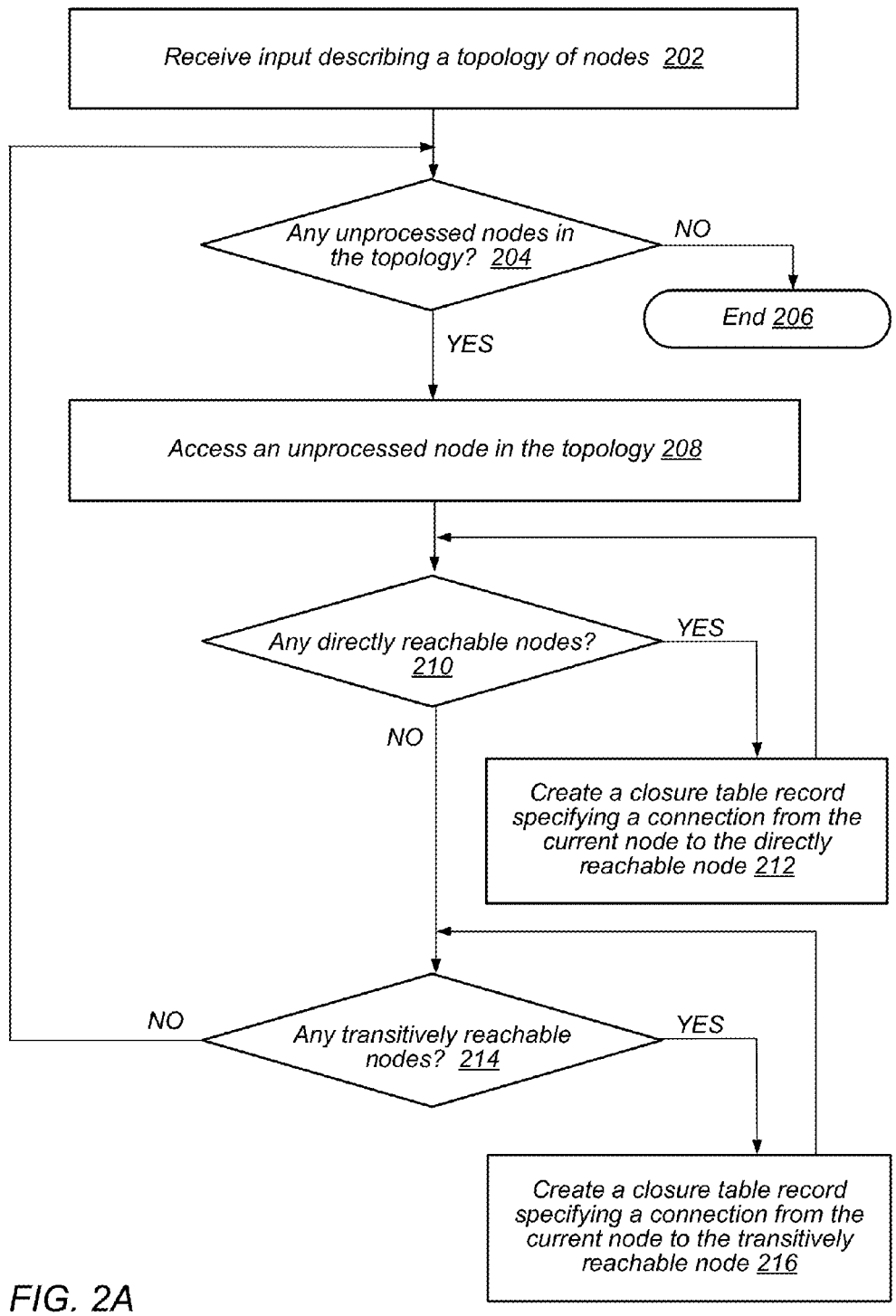
FIG. 2A illustrates a flowchart depicting selected operations for creating a closure table from a topology, according to some embodiments.

In this example, the topology service may process each node in the inputted topology in order to create a closure table, as depicted at 204-216 of FIG. 2A. Specifically, the topology service may select an initial, unprocessed node from the topology of nodes, and determine whether there are any directly reachable nodes from the current unprocessed node, as depicted at 204, 208, and 210. If the topology service determines that there is a directly reachable node, then the topology service may create a closure table record specifying a connection from the current node being processed to the directly reachable node, as depicted at 212. A closure table record is created for each of the directly reachable nodes from the current node being processed. At the point that there are no more directly reachable nodes from the current node being processed, the topology service may determine whether there are any indirect, or transitively reachable nodes, as depicted at 214. If there are any transitively reachable nodes from the current node being processed, then a closure table record is created for each of the transitively reachable nodes from the current node being processed, as depicted at 216. At the point that there are no more transitively reachable nodes from the current node being processed, the topology service may select another unprocessed node from the topology service, as depicted at 204. If there are no more unprocessed nodes within the topology, then the creation of the closure table is complete, processing may complete and the topology service may continue on as depicted at 206. In this manner, for each given node within the topology, a closure table record is created for each directly and transitively reachable node in the topology from given node.

In other words, in response to a user entering the nodes and directed edges for the topology, the topology service may create additional, indirect edges in order to augment the closure table. These one or more indirect connections are directed and may be determined from the records including direct connections already specified and already present in the closure table so far.

Further, the indirect connections may be identified from pairs of directly connected nodes such that for each given pair of nodes, one of the nodes in the given pair of nodes is transitively reachable from the other node in the given pair of nodes according to the direction of the edges between the two given nodes in the directed acyclic graph.

In some embodiments, the topology service, in determining the transitively reachable nodes for a given node, may consider a node that has already been processed and for which the transitively reachable nodes have already been determined. In such a case, as an optimization, the topology service may simply copy the records for the node being considered and for which the transitively reachable nodes have already been determined; however, the topology service would substitute each instance of the node being considered with the given node currently being processed. Once this substitution has been done, the records may be added to the closure table, and a similar process may be performed for every other node connected to the given node currently being processed that has also already been processed.

In this example, indirect edges 130, 132, 134, and 136, illustrated as dotted lines, are directed edges which are not entered from the user in creating a topology. Instead, indirect edges 130, 132, 134, and 136 are determined and recorded in the closure table according to the topology service. Further in this example, these indirect edges are determined as the topology service determines, for each given node of the directly connected nodes, that another node is transitively reachable, and when determined as such, the transitively reachable node is added to the closure table as being paired with the given node, as depicted at 208b.

In this way, the topology service may create a closure table, such as closure table 150, that corresponds to the directed acyclic graph 100 of the defined topology and is illustrated in FIG. 1C, where the closure table 150 includes the information from the user definition of the topology, the direct connections depicted as solid edges, in addition to the information created according to the topology service, the indirect connections depicted as dotted edges. In other embodiments, the closure table may be represented differently. In other words, some embodiments of a topology service may merely require a closure table that may be indexed according to either an ancestor or descendent node.

In closure table 150, for every directed edge in directed acyclic graph 100, the directed edge is represented with at least information regarding the nodes in the connection, or the ancestor node and the descendant node.

Further in this example, closure table entry 152 corresponds to directed edge 118, closure table entry 154 corresponds to directed edge 130, closure table entry 156 corresponds to directed edge 120, closure table 158 corresponds to directed edge 132, closure table entry 160 corresponds to directed edge 122, closure table entry 162 corresponds to directed edge 134, closure table entry 164 corresponds to directed edge 124, closure table 166 corresponds to directed edge 136, closure table entry 168 corresponds to directed edge 126, and closure table entry 170 corresponds to directed edge 128.

As discussed above, given the closure table 150, which corresponds to directed acyclic graph 100, the topology service is capable of answering certain kinds of queries. Specifically, the topology service is capable of answering queries regarding existing connections between nodes of the topology, such as whether or not a particular server is connected to a particular rack. Such answers may depend on connections within a representative directed acyclic graph as represented with a closure table, but certain other questions may not be answerable without additional information regarding characterizations, or rules specifying the relationships among the elements of the topology.

In short, to provide users with a wider set of queries for which the topology service may provide answers, the topology service may additionally rely or depend on a metagraph. As described above, a metagraph may represent rules, or characterize relationships among elements of a topology, or specify restrictions among elements of a topology.

In some embodiments, a metagraph may specify a validation structure to constrain users to allowable or permissible changes to a topology. For example, a metagraph may specify that buildings may only be modified if a user belongs to a particular user group, or that a server may only be added or modified if a user belongs to a different user group.

In some embodiments, a metagraph may provide information such as whether two nodes in a topology are connected without specifying an entire path through the connection. In other words, the metagraph may specify whether or not nodes are indirectly connected. For example, given the closure table alone, there may exist records for {A, B}, {B, C}, and {A, C}, even though the current topology only has the following direct connections: A→B→C. In this case, while the closure table for the topology may indicate a connection from A to C, the metagraph specifies that there is no direct connection between A to C.

In some embodiments, given that a closure table representation of a topology may lose some information regarding the originally defined connections between nodes, some queries with regard to the structure or connections within a topology may depend on the information about the topology specified within a metagraph.

In other embodiments, the information represented within the metagraph may be represented within an augmented closure table. In other words, the metagraph is a convenient logical tool that is a useful concept in separating information regarding attributes defining a topology from the list of connections as represented in a closure table.

For example, in regard to closure table 150 in FIG. 1B, the information regarding direct connections may be added though the addition of another column titled, for example, "DISTANCE", where this column stores the distance between the pair of nodes. For example, if the distance between the pair of nodes for a given closure table entry is 1, then the pair of nodes are directly connected, and if the distance between the pair of nodes is 3, then the pair of nodes are indirectly connected with two nodes between them, and so on. Further, the closure table may be further expanded to represent each piece of information for which a metagraph is used.

In short, because a closure table representation of a topology may result in topological information being lost, the information potentially lost must somehow be captured and stored, whether in the closure table, or in the metagraph, or some other construct. Otherwise, the ability to answer certain queries regarding the structure of a topology may be lost.

Further in regard to metagraph information that may be stored, such information may include rules specifying that a rack may include servers, that a rack may include switches, that a rack may include PDUs, that a server may include drives, that a server may include motherboards, among much more information.

In some embodiments, such information may not be required to be provided by a user, and instead, such metagraph information may be stored for different kinds of topologies before a topology is created that may use the metagraph. For example, for data centers, the metagraph information provided above may be applicable to many different types of data centers, and a user may simply add rules or restrictions that are different from common data center topologies through an interface of the topology service. In the case where a data center topology is standard, the user may not be required to enter any information at all beyond simply specifying or selecting a data center topology metagraph from a selection presented to the user from an interface of the topology service.

In some embodiments, different types of information may be stored in different metagraphs. For example, a metagraph may exist regarding an existing topology as provided by a user. However, in some embodiments, a metagraph may also be defined for data centers, where a data center graph may specify that a data center may have rooms, that a room may have rack positions.

Further, in some embodiments, this data center graph may be connected to another graph with the addition of a rule. For example, a metagraph may be defined to specify information regarding racks (rack may include servers; rack may include switches; rack may include PDUs) and may be considered a rack graph. This rack graph may be connected to the above data center graph through the addition to the data center graph of a rule specifying that a rack position may include a rack, and this same rule may be added to the rack graph.

These connected metagraphs may be considered a multi-graph metagraph. Further, when a corresponding topology is updated or modified, for example through the insertion of a node into the topology, the topology service may update one relevant metagraph and then continue to update each connected metagraph that is connected through a relationship that is relevant to the added node. A further discussion of the idea of multiple, connected metagraphs or subgraphs of a topology is discussed below in regard to FIG. 4B.

Figure 3:
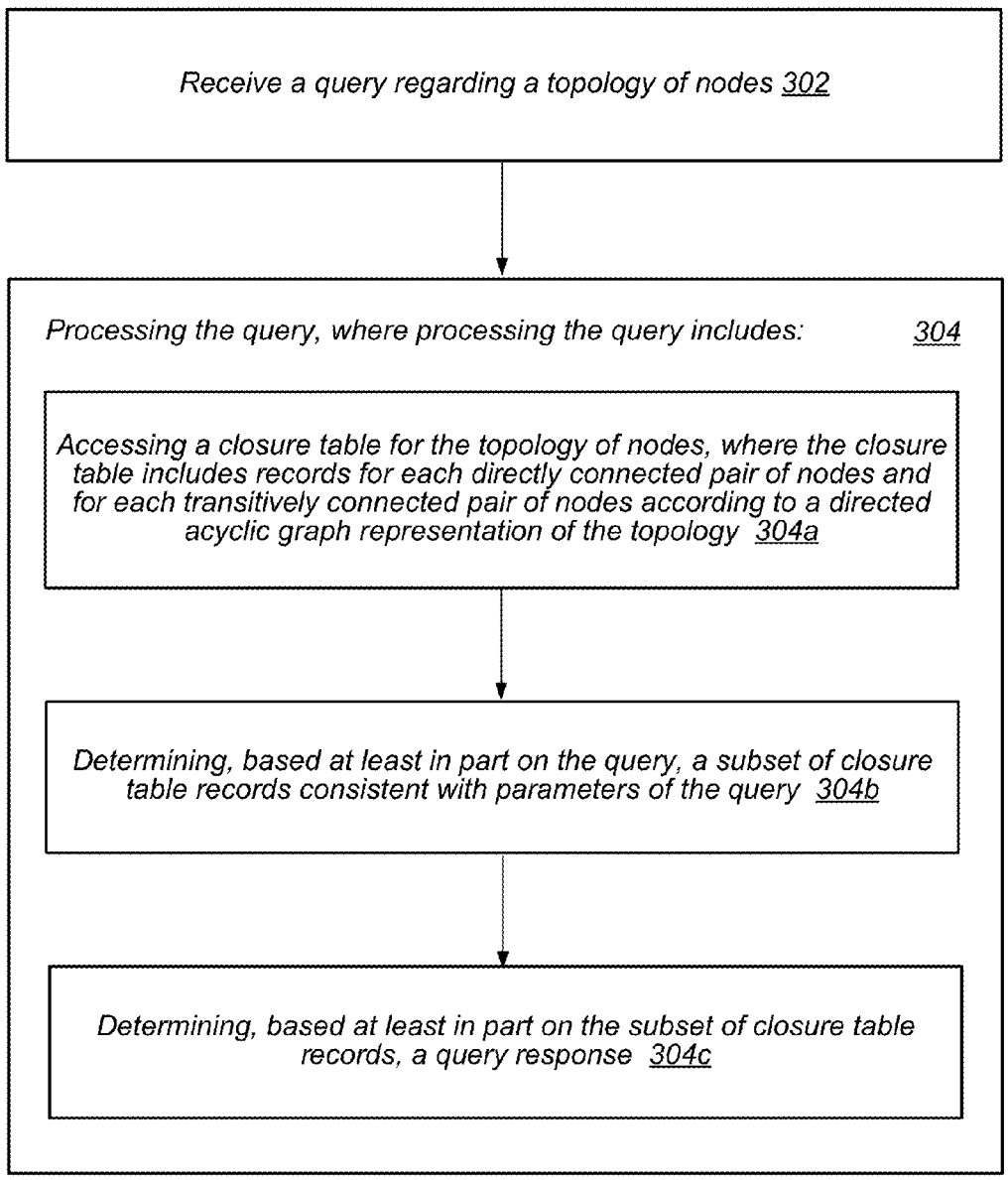
FIG. 3 illustrates a flowchart depicting selected operations of a topology service in receiving and responding to a query, according to some embodiments.

Turning now to FIG. 3, once the topology service has created a closure table determined from a topology of nodes, and where the topology service has created or has access to a metagraph or a multi-graph metagraph, the topology service is capable of answering queries regarding the topology of the data center.

In this context, the topology service may receive a query regarding some aspect of the topology of nodes, as illustrated at 302. As discussed above, this query may be received through a user interface or through an application programming interface communicating with some other software application being used by a user entering the query.

In response to receiving the query, as illustrated at 304, the topology service may perform several operations in answering the query. Among these operations, the topology service may access the closure table for the topology of nodes, where the closure table includes records for each directly connected pair of nodes in addition to records for each transitively connected pair of nodes in the topology of nodes, as illustrated at 304a.

Given the closure table, the topology service may determine, based at least in part on the parameters defining the query, a subset of records for one or more connections in the topology, as illustrated at 304b. From this subset of records of the connections within the closure table, the topology service may determine the connections in the subset consistent with the query parameters in order to determine a query response, as depicted at 304c.

In other embodiments, a metagraph may be used in determining an answer to the query, and such a use of the metagraph may occur, for example, after 304b and before 304c in FIG. 3. For example, information within a metagraph may also be accessed to determine permissible relationships between nodes within a subset of nodes determined at 304 in order to remove nodes from the subset of nodes that are inconsistent with the permissible relationships.

As an example, the query may be a query as to which rack PDU is connected to a particular server, where the query specifies server 110, and where the topology in this example is represented with directed acyclic graph 100 in FIG. 1A.

Therefore, in this example, the connections identified are {server 110, rack 114} and {server 110, rack PDU 116}, which are entries in closure table 150, and where the closure table may be indexed according to server 110 provided within the query. Further, note that connection {server 110, rack 114} is a direct connection and that connection {server 110, rack PDU 116} is an indirect connection determined and created when creating the closure table.

In this example, we have two connections to consider, and the topology service may use the metadata in the metagraph to determine which of the connections may serve to answer the query. In this regard, the topology service may access a metagraph corresponding to the topology. A metagraph and metadata may be interchangeable terms.

At this point, the topology service may use the metagraph to determine which of the two connections, connections {server 110, rack 114} and {server 110, rack PDU 116}, may serve as the basis for an answer to the query. Given that the query is interested in knowing the rack PDU is connected to server 110, the metagraph may specify that rack PDU 116 is indeed a rack PDU. In other words, that node 116 in the directed acyclic graph is of type "rack PDU". Using this information, the topology service may determine that connection {server 110, rack PDU 116} may serve to answer the query. In this example, the topology service would return an answer of rack PDU 116 in response to the query as to which rack PDU is connected to server 110.

Further, in answering this query, the topology service made use of an indirect connection, or transitive connection, that was determined in creating the closure table, and that this indirect connection allowed the topology service to answer the query without recursion because the closure table listed server 110 and rack PDU 116 as a connection within the closure table. This avoidance of recursion is in contrast to prior art methods that represent topologies as adjacency lists, and which would not list indirect connections, and would thereby rely on recursive processing to answer a similar query.

The example query processed is simply one type of query which may be answered given this example closure graph and metagraph. In another example, it may be that a user becomes aware that multiple servers have gone down. In this example, if we could inform the user that all of the multiple servers that have gone down are connected to the same rack PDU, the user may have reason to suspect that the issue is not with the servers themselves, but rather with the rack PDU to which the servers are connected.

In this scenario, the topology service may provide an answer because even though the initially defined topology may not indicate connections between the servers that have gone down and the corresponding rack PDU, the closure graph would have created connections indicating such a connection. Therefore, the user may simply query the topology service for the entities connected to the servers that have gone down, or common entities connected to each of the servers that have gone down.

In other cases, as with the previous example, the indirect connections created when creating the closure table may be leveraged to answer queries that would not be answerable if only the direct connections were represented or to update information about the underlying topology. For example, if a user were to update the topology such that server 110 is no longer connected to rack 114, then the topology service may infer that server 110 is no longer connected to rack PDU 116, and this information may be represented in an update to the corresponding metagraph.

Figure 4A:
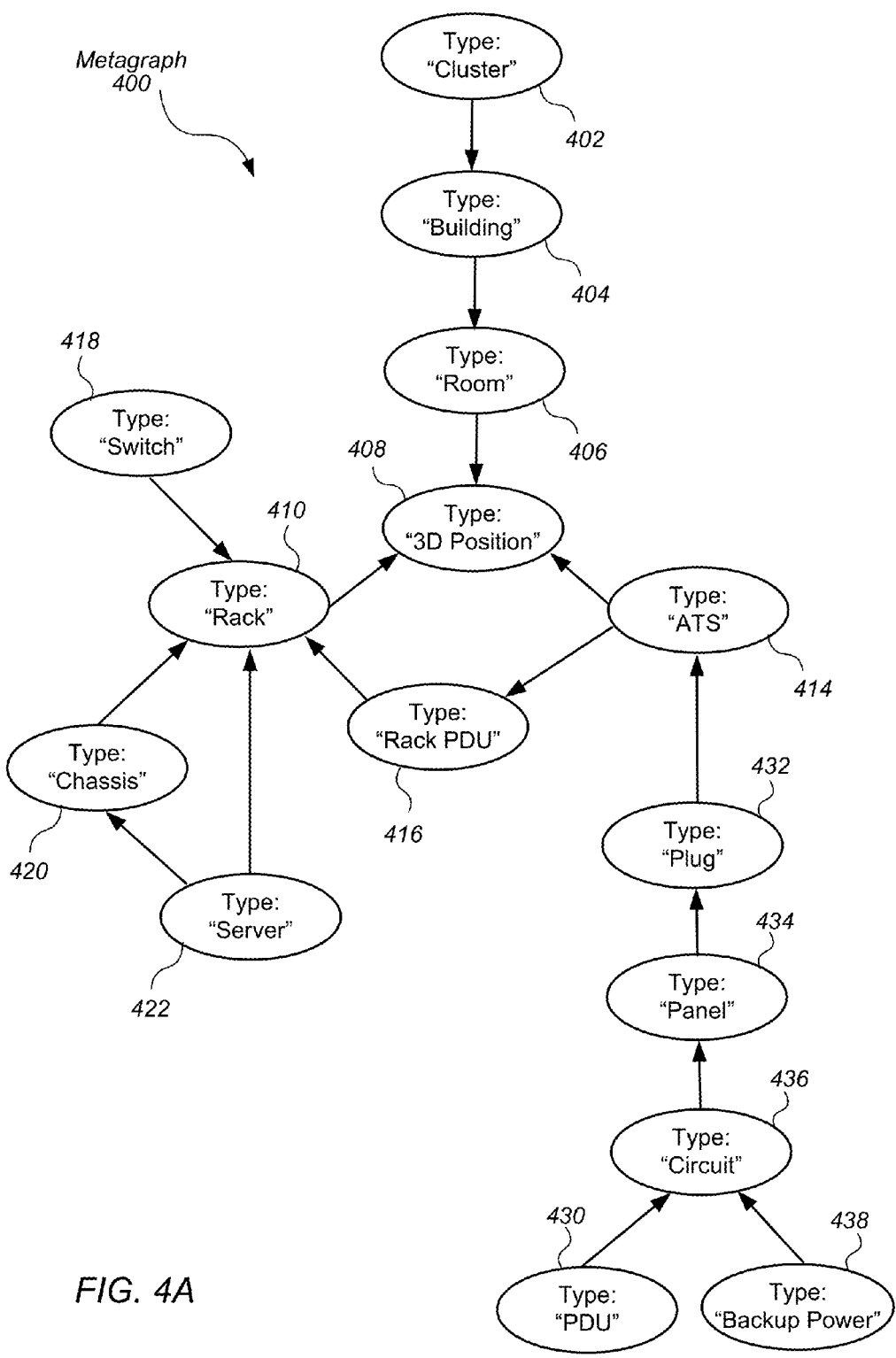
FIGS. 4A and 4B illustrate an example metagraph and topology corresponding to a data center, according to some embodiments.

In FIG. 4, restrictions for an example topology are illustrated as represented according to metagraph 400. The rules for this topology are for a data center, similar to the data center representation of FIG. 1A, but with greater detail. As noted above, a metagraph may exist prior to a user providing a specification of a particular topology and the metagraph may be used in verifying the topological information provided from the user through the interface of the topology service.

In this example, the relationship represented with a directed arrow corresponds with the description presented in introducing the nodes of the topology. As illustrated, a cluster type 402 may correspond to one or more building types 404, and building type 404 may include one or more room types 406. Within a room instance of a room type there may be defined several physical spaces which may be defined according to three-dimensional (3D) positions, as depicted with 3D position type 408. Further, instances within a topology of a rack type 410, and an automatic transfer switch (ATS) type 414, may be specified to occupy respective 3D spaces within a room, or an instance within a topology of a 3D position type 408.

While ATS type 414 is directly connected to 3D position type 408, ATS type 414 may also be directly connected to rack PDU type 416, signifying that an instance of a rack PDU type may be connected to an instance of an ATS and that an instance of a 3D position type may specify the position of an ATS.

Further, a plug type 432, may be directly connected to ATS type 414. In turn, power distribution unit (PDU) type 430 may be directly connected to circuit breaker type 436, and circuit breaker type 436 may be directly connected to panel type 434, which may be directly connected to plug type 432. Similarly, backup power type 438 may be directly connected to circuit breaker type 436, and circuit breaker type 436 may be directly connected to panel type 434, and panel type 434 may be directly connected to plug type 432.

Further in this example, instances of rack type 410 may house several elements of the topology, represented as nodes 418, 420, and 422, which are, respectively, a switch type, a chassis type, and a server type. Instances of chassis type 420 may include one or more servers, depicted as server type 422.

Metagraph 400 is a representation of the direct connections allowable in a topology of a data center, where instances of specific nodes and connections in a particular data center specification may be specified as a user inputs nodes and connections to the topology service.

Further, in some embodiments, the connections within the metagraph may indicate information such as quantities, for example, metagraph 400, as part of rack type 410, may specify that no more than a certain number of servers may be included within a rack of rack type 410. In other cases, there may be more than one rack type with different properties, such as the capability of housing a different number of servers.

Figure 4B:
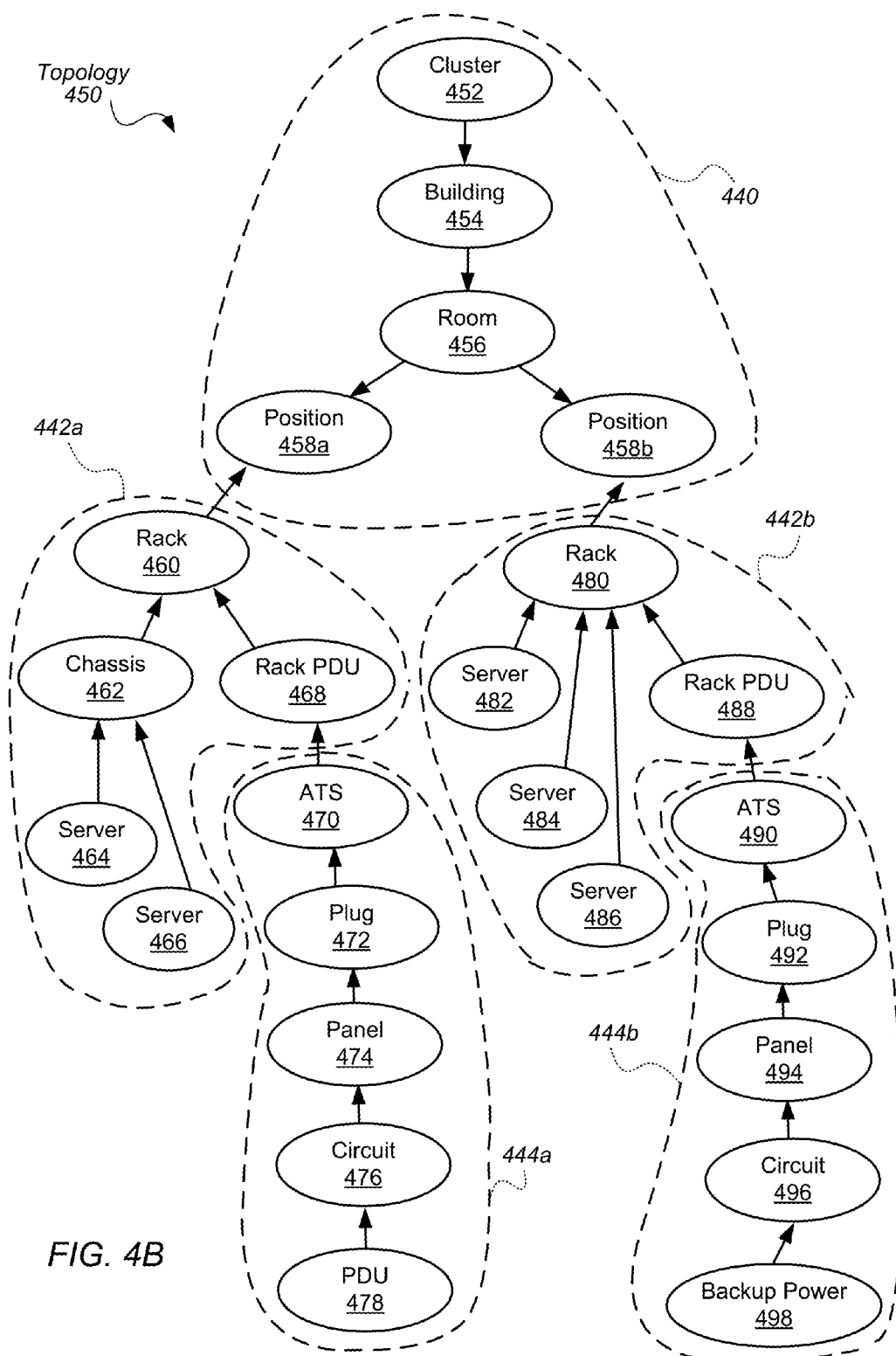

FIG. 4B depicts an instance of a specific topology, topology 450, defined in accord with metagraph 400. In some embodiments, not every type of node within metagraph 400 needs to be present within a topology constructed according to the metagraph. However, in some cases, the metagraph may specify that some node types are necessary, for example, a server may be necessary in a topology specification, but a chassis may not be necessary. This information regarding whether certain types of nodes are necessary may be used when the topology service is creating a topology from input for a topology, and if a node of a certain type has not been specified, the topology service may determine, according to the metagraph, that the node of the certain type is necessary and notify a user.

In topology 450, a cluster 452 has been defined and cluster 452 corresponds to building 454. In practice, building 454 may have multiple rooms, but in this example, building 454 includes room 456. Room 456 would correspond to an actual physical space, and the positions within the physical space of the room may be represented according to one or more defined three-dimensional position spaces.

In this simple example, two 3D positions may be specified, 458a and 458b, where position 458a specifies a space occupied by rack 460, and where position 458b specifies a space occupied by rack 480. Rack 460 includes multiple specified elements, including a chassis 462, where chassis 462 includes two servers, servers 464 and 466. Rack 460 is also connected to and powered by rack PDU 468, which is connected to ATS 470. In this example, ATS 470 is connected to plug 472, and plug 472 is connected to panel 474, and panel 474 is connected to circuit breaker 476, and circuit breaker 476 is connected to PDU 478.

Further in this example, rack 480 includes three servers, servers 482, 484, and 486. Rack 480 is also fed power according to the depicted chain of nodes, including rack PDU 488, ATS 490, plug 492, panel 494, circuit breaker 496, and backup power 498.

As described above in regard to FIG. 1A, the topology service may create a closure table to represent each pair of connections in a corresponding directed acyclic graph of a topology, which would include pairs of connections between each given node and each transitively reachable node beginning at that given node. Using the closure table, and using a corresponding metagraph or metadata, the topology service, similar to the process described above in regard to FIG. 3, may answer queries regarding the topology corresponding to metagraph 400.

In some embodiments, the metagraph may represent distinct regions or groups of responsibility for distinct portions of a topology. For example, nodes of type "Cluster", "Building", "Room", and "3D Position", may all be modifiable and managed by users of certain group, say a physical maintenance group. More generally, within a particular topology, such as topology 450, constructed according to a metagraph, there may be any number of different portions of the topology that may be specified as being modifiable by a certain user or users. Further, there may be users with permission to modify multiple portions, or overlapping portions of the topology. Further, for any portion of the topology, different users may be granted different levels of permission for modifying, adding, or deleting to the topology.

In FIG. 4B, in a topology 450 consistent with metagraph 400, the portion of the topology including nodes 452, 454, 456, 458a, and 458b, may belong to a group where users in the group may have user permissions allowing for those users to modify this portion of the topology, as depicted with group 440.

Further in this example, nodes of type "Server", "Chassis", "Switch", "Rack", and "Rack PDU", may all be modifiable and managed by a different group of users, say a rack management group. In FIG. 4B, in topology 450, the portion of the topology including nodes 460, 462, 464, 466, and 468, may belong to a group where users in the group may have user permissions allowing for those users to modify this portion of the topology, as depicted with group 442a. Similarly, the portion of the topology including nodes 480, 482, 484, 486, and 488, may belong to the same rack management group, and the same users as may modify group 442a may modify group 442b.

Further in this example, nodes of type "ATS", "Plug", "Panel", "Circuit", "PDU", and "Backup Power", may all be modifiable and managed by a different group of users, say a power management group. In FIG. 4B, in topology 450, the portion of the topology including nodes 470, 472, 474, 476, and 478, may belong to a group where users in the group may have user permissions allowing for those users to modify this portion of the topology, as depicted with group 444a. Similarly, the portion of the topology including nodes 490, 492, 494, 496, and 498, may belong to the same power management group, and the same users as may modify group 444a may modify 444b.

Figure 5:
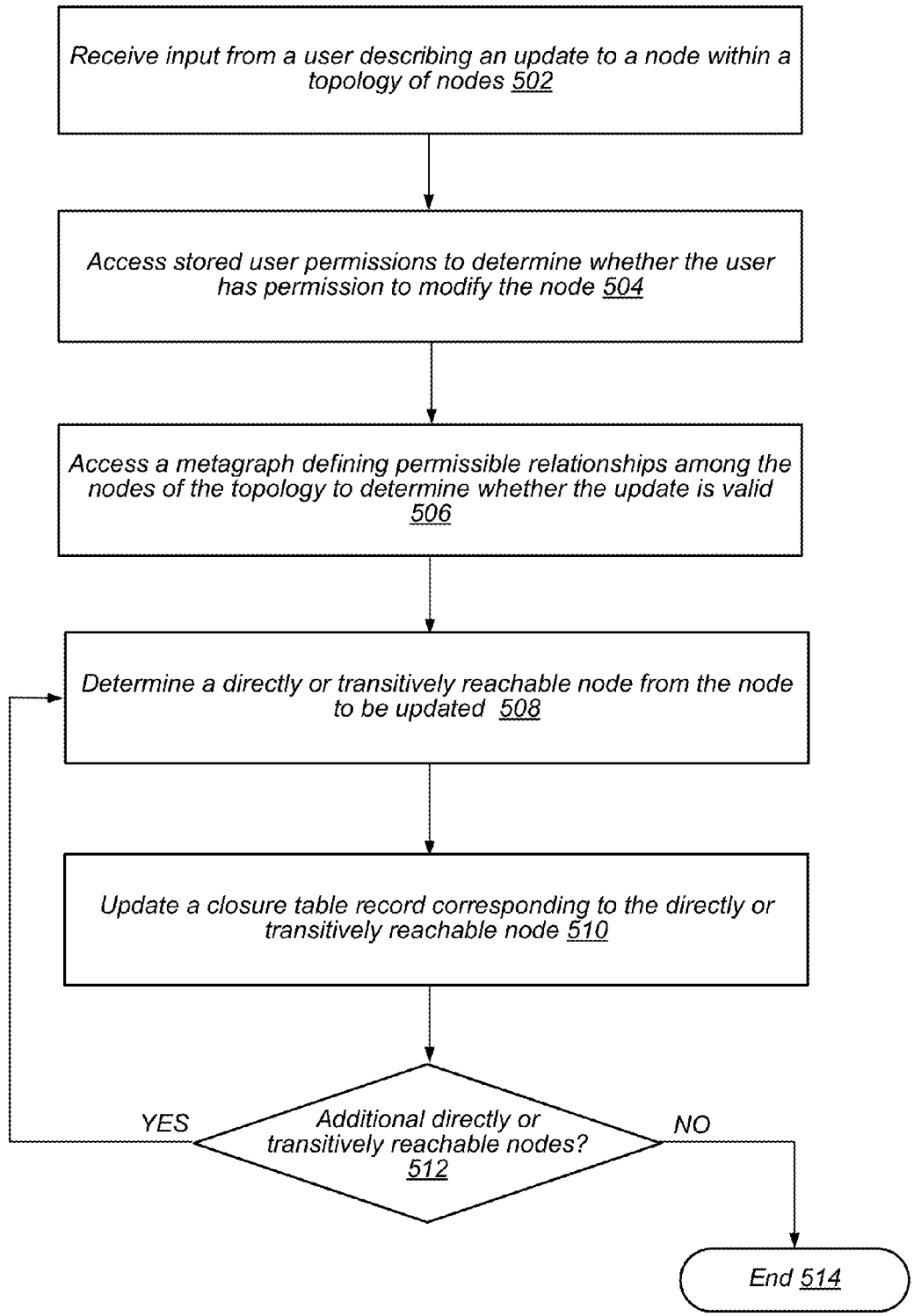
FIG. 5 illustrates a flowchart depicting selected operations of a topology update, according to some embodiments.

Once the topology service has constructed a given topology and a corresponding closure table, it may be the case that a user may, granted the user has the proper user permissions, update a given node or nodes, or connection or connections, or portions of the topology within the topology. An example of such an update is illustrated in the flowchart of FIG. 5.

As noted, given a previously constructed topology, the topology service may receive input from a user describing an update to be performed in regard to a particular node or portion of the topology within the topology of nodes, as depicted at 502. The topology service may, in response to the update request, determine whether or not the user has the proper permissions to perform the requested update, as depicted at 504. This permissions check may be done through an access of a corresponding permissions record storing various permissions for various users in regard to nodes or portions of the topology.

Once the topology service has determined that the user has the permission to perform the update, the topology service may proceed to determine whether or not the update requested is valid according to the metagraph for the topology, as depicted at 506. For example, the user may be attempting to connect nodes of the topology that are not allowed. In other embodiments, the order in which the update is validated is interchangeable; in other words, the metagraph may validate the update after the permissions have been validated.

As described above, a given node within a given topology may be connected, either directly or transitively, to several other nodes. Given such connections, the topology service may determine that other nodes in the topology should also be updated. To this end, the topology service may query the closure table to identify all downstream nodes from the updated node, as depicted at 508.

Once the downstream nodes to be updated have been identified, the topology service may proceed to update each corresponding closure record in the closure table, as depicted at 510, 512, and 508, where the topology service iterates over each identified node connected to the updated node that is either directly or transitively reachable from the updated node. Once the updates have been performed, the update may end, and the topology service may continue executing, as depicted at 514.

In other embodiments, the metagraph 400 may serve as a reference for the topology service in determining notifications that updates to nodes in an instance of a topology using metagraph 400 are required. For example, if a user from the rack management group adds a server to a rack, the user may update the topology to reflect the addition. In response, the topology service may modify the closure table for the particular instance of the topology, and further, the topology service may determine which other portions of the topology or metagraph also need an update in response to the addition.

In some embodiments, the metagraph for a topology may be represented as a closure table, and the topology service may reference the closure table to determine whether or not any nodes under the management of a different group, or any nodes that are within a chain of connections of other nodes not directly updated, are connected to a given node. For example, the topology service may index the closure table for the node in the metagraph closure table and determine all records with a connection to the updated node that has been indexed, in this manner, the topology service may determine each connected node that may need to also be updated. For example, rack type 410 is connected to 3D position type 408, and building type 404 is transitively connected to 3D position type 408.

Figure 6:
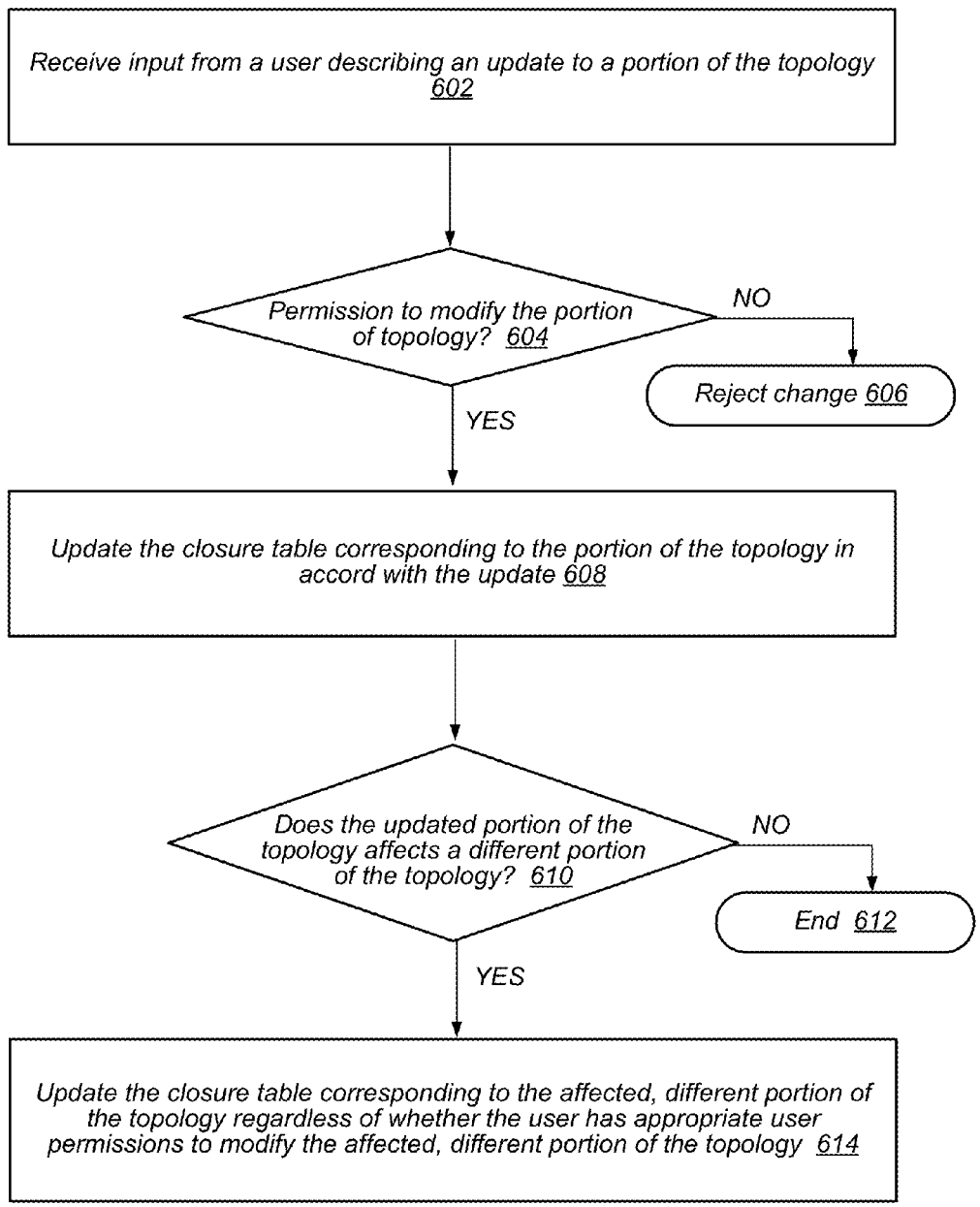
FIG. 6 illustrates a flowchart depicting selected operations of a topology update, according to some embodiments.

In one embodiment of the topology service updating a node within a topology, the topology service may determine that a direct update to a particular node in the topology may require updates to other nodes in the topology for which the user does not have the proper permissions to perform an update. Such a circumstance is the context for the flowchart depicted in FIG. 6.

Further, in some embodiments, each separate portion of the topology may correspond to an independent, executing process, perhaps executing on different computer systems. Further, each of these different portions of the topology may correspond to respective closure tables, where the multiple portions of the topology and the multiple closure tables are connected due to having common records for connecting nodes between the different portions of the topologies. In such a configuration, the different processes for the different portions of the topology may communicate through notifications in order to propagate updates or other types of information.

In this example, the topology service may receive input from a user describing an update to a portion of a topology, as depicted at 602. In some cases, the update may be the addition or deletion a node or the addition or removal of a direct connection between existing nodes, or to some other characteristic of the topology.

In response, the topology service may determine whether the user has the proper permissions to make updates to the portion of the topology, as depicted at 604. In some cases, the topology service may access stored user permission information to determine whether or not the user has permission to update the particular portion of the topology. If the user does not have the proper permissions, the update may be rejected, the user notified, and processing of the update may end, as depicted at 606.

Otherwise, granted that the user has permission to update the portion of the topology, and the topology service may update the closure table for the topology, as depicted at 608. For example, if a new node is added, the topology service may create new records for connections to and from the new node in the closure table for the topology.

In some cases, the updated portion of the topology may be connected to other portions of the topology and the change to the updated portion of the topology may be relevant to or affect other portions of the topology. For example, in the case of the addition of a node, it may be that the new node is downstream, or transitively reachable from a node in another portion of the topology, and that there is a separate closure table for that portion of the topology that needs to be updated. The determination of whether any portions of another topology are affected is depicted at 610. If the topology service determines that no other portions of the topology are affected, the update may complete, as indicated at 612.

In another example, an update to the topology may be a removal of a node from the topology, such as the removal of a bad server. To handle a delete, similar to handling a node addition, the topology service would index into the closure table according to a node identifier for the node to be deleted by both the ancestor and descendant fields. Indexing according to both ancestor and descendant would result in locating each record in the closure table in which a record exists such that the node to be deleted is either an ancestor or descendant. In some cases, the topology service would also delete a record for each node that is downstream from the node to be deleted, including records where the downstream node is a descendant or ancestor. For example, if the topology specified a node as a server and that the server node pointed to a motherboard node, then the motherboard node would be downstream from the server node. In this example, it would make sense for the topology service, when deleting the server node from the topology, to also delete the motherboard node from the topology. In other cases, it may make sense for downstream nodes to remain within the topology. In some embodiments, a rule on whether or not downstream nodes are to be deleted for a given node type may be stored within a metagraph corresponding to the topology.

Otherwise, if the update affects other portions of the topology, the topology service may have several options. The topology service may simply update the closure table in regard to the other, affected portion of the topology to be consistent with the direct update to the topology, even though the other portion of the topology would require different permission from the user performing the update directly, as depicted as 614. As noted above, the other, affected portion of the topology may have a respective closure table, and this respective closure table may be updated to be consistent with the directly updated portion of the topology. In the example of adding a node, the respective closure table would be updated to add new records to reflect connections to the added node.

In other words, regardless of whether or not the user has the permission to directly modify the other, affected portion of the topology, the topology service may perform an update. In this way, the topology service ensures the entire topology remains consistent through an indirect update to another portion of the topology prompted by a direct user update to an initial portion of the topology.

However, in other cases where the user does not have the proper permission to directly update the other affected portion of the topology, the topology service may perform the update while also generating an update notice to a user or administrator, with permission to modify the portion of the topology including the connected node, notifying of the update.

For example, as discussed above, the addition of a server to a particular rack, say server 466 and rack 460. In this example, position 458a is downstream from rack 460, but position 458a, according to metagraph 450, belongs to a different group. In such a case, the user would not have permission to modify position 458a, and instead, the topology service would generate a notice to a user from group 440.

A downstream node is a node that is pointed to from another node according to edge directions between the nodes in a given topology. For example, according to topology 450, position 458a is downstream from both rack 460 and from server 466. In this example, position 458a is also downstream from cluster 452. In other words, position 458a servers a junction point between groups 442 and 440, according to the corresponding groups described for metagraph 400.

In other examples, a directed acyclic graph and a corresponding metagraph may represent prerequisites for university courses, where for a given course, one or more courses must be taken first. In this example, the edges may simply represent an order in time, and each node may be a course, where the corresponding metagraph may further specify whether some courses may be taken at all. For example, a metagraph may specify that a liberal arts major may not be eligible to take an engineering physics course, even if the engineering physics course has no prerequisites and an engineering student would be eligible to take the course.

Generally, a directed acyclic graph and a corresponding closure table and metagraph may represent any particular structure or configuration of nodes within an abstract data set or physical system.

Figure 7:
FIG. 7 depicts selected elements of an example query provided to a topology service, according to some embodiments.

With regard to the metagraph 400 of FIG. 4, a user may provide to the topology service a query such as query 700 depicted in FIG. 7. While query 700 is depicted according to a particular syntax, the syntax is simply one example and several other syntaxes are possible. Further, in some embodiments, the closure table may be indexed according to either an ancestor node or a descendent node. For example, in querying for all nodes connected to a particular node, the particular node may be the common descendent node for a group of other nodes, and the topology service may index the closure table according to the particular descendent node to identify each of the ancestor nodes of the descendent node.

In this example, a user is attempting to determine a count of every host asset by building. To this end, the query specifies the building name ("building.node_name") and the topology ("topology") such that a descendent node identification within the directed acyclic graph is equal to the host identification, and where the ancestor node identification is equal to the building identification, and where the "host" and "building" within the query are specified to be of type "HOST" and "BUILDING", respectively.

Given these specifications within the query, the topology service may generate the results and group them according to a node name, where the nodes that are returned are determined to be nodes representing assets within the building. Further, an advantage of such a query is that the query need not specify the particular types of assets, and as such, no assets that otherwise satisfy the ancestor and descendent criteria of the query would be missed.

Example Computer System

Figure 8:
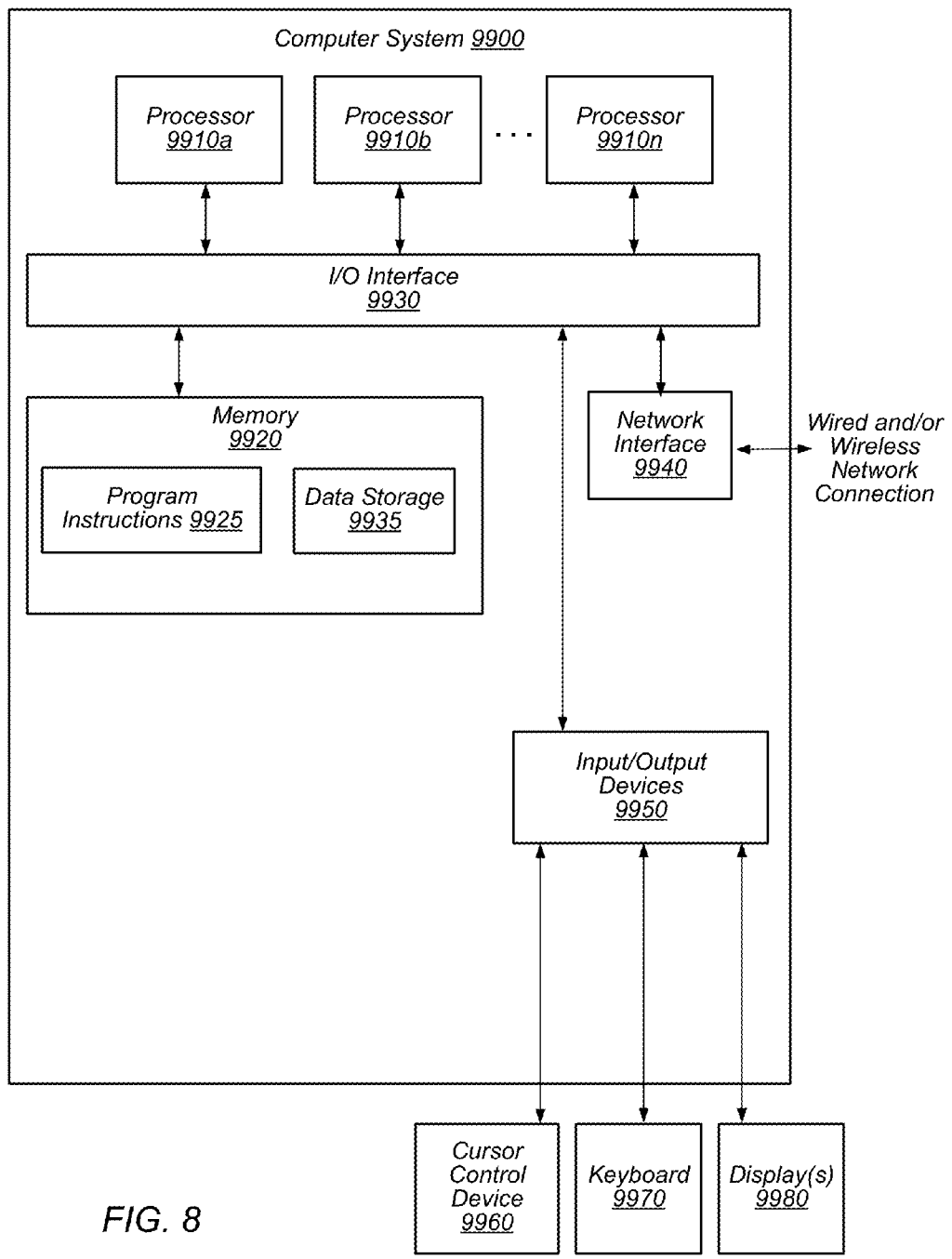
FIG. 8 depicts selected elements of an example computer system capable of implementing the various embodiments of a topology service.

FIG. 8 illustrates computer system 9900 that may execute the embodiments discussed above. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, computer system 9900 includes one or more processors 9360a-9360n coupled to system memory 9370 via input/output (I/O) interface 9380. The computer system further includes network interface 9390 coupled to I/O interface 9380, and one or more input/output devices 9382, such as cursor control device 9960, keyboard 9970, and one or more displays 9980. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented with program instructions configured for execution on one of, or parallel execution on two or more of, such GPUs. The GPU(s) may implement one or more application programmer interfaces (APIs) that permit programmers to invoke the functionality of the GPU(s).

System memory within the computer system may be configured to store program instructions and/or data accessible from a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data may implement desired functions, such as those described above for the various embodiments are shown stored within system memory 9370 as program instructions 9925 and data storage 9935, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted from transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for another component to use. In some embodiments, the I/O interface may include support for devices attached through various types of peripheral buses. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data from one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement each of the embodiments described herein. In one embodiment, the program instructions may include software elements of embodiments of the modules discussed earlier. The data storage within the computer system may include data that may be used in other embodiments. In these other embodiments, other or different software elements and data may be included.

Those skilled in the art will appreciate that the computer system is merely illustrative and is not intended to limit the scope of the embodiments described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality depicted within the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored on a computer-accessible medium or a portable article to be read from an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. A non-transitory, computer-readable storage medium may include storage media or memory media such as magnetic or optical media such as disks or DVD/CD-ROM, volatile or non-volatile media such as RAM, ROM, and flash drives. More generally, computer-accessible or computer-readable storage media may also include transmission media or signals such as electrical, electromagnetic, or digital signals, conveyed via a communication medium such as network and/or a wireless link.

The various methods described herein represent example embodiments of methods. These methods may be implemented in software, hardware, or through a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more databases storing a closure table and a metagraph, wherein the closure table represents a directed acyclic graph descriptive of a topology of nodes, and wherein the metagraph defines permissible relationships between types of nodes in the topology of nodes; and
one or more computers configured to implement a topology service, wherein the topology service comprises:
a client interface configured to receive input for creating or modifying the topology of nodes;
a metagraph module implemented via one or more processors of the one or more computers and configured to access the metagraph to determine validity of the input for creating or modifying the topology of nodes; and
a closure table module implemented via one or more processors of the one or more computers and configured to, based at least in part on the input, create or modify the closure table representing the topology of nodes.

2. The system of claim 1, wherein the input specifies adding a node to the topology of nodes, and wherein to determine validity of the input, the metagraph module is further configured to:
identify, based on the metagraph, a first type for the node;
identify, based on the metagraph, a second type for another of the nodes of the topology of nodes, wherein an addition of the node to the topology of nodes creates a connection between the node and the other node;
identify, within the metagraph, a relationship between nodes of the first type with nodes of the second type, wherein a relationship is based at least in part on a node of the first type being connected to a node of the second type within the metagraph; and
determine whether the connection between the node and the other node is valid based on the relationship identified within the metagraph.

3. The system of claim 1, wherein to create the closure table, the closure table module is further configured to:
create a record in the closure table for each directly connected pair of nodes described within the received input; and for each given node of the topology of nodes:
    identify, based on the input, each node of the plurality of nodes that is transitively reachable from the given node according to the directed acyclic graph, wherein each node transitively reachable from the given node is not specified in the input as directly connected to the given node, and
    for each identified node that is transitively reachable from the given node, creating a closure table record specifying a connection from the given node to the transitively reachable node.

4. A method, comprising:
performing, by one or more computing devices:
    receiving input describing a modification to a topology of nodes, wherein a closure table stores a representation of the topology of nodes, and wherein the closure table includes an entry corresponding to each direct connection or transitive connection between nodes of the topology of nodes;
    determining one or more, new or existing, nodes or connections in the topology of nodes corresponding to the modification to the topology of nodes; and
    modifying the closure table storing the representation of the topology of nodes, wherein the modifying comprises:
        for each of the one or more, new or existing, nodes or connections in the topology of nodes, creating or modifying an entry in the closure table in accordance with the modification to the topology of nodes.

5. The method of claim 4, wherein the modification includes an addition of a node into the topology of nodes, and wherein the method further comprises:
    prior to the modifying the closure table:
        accessing a metagraph to identify a rule corresponding to a connection between the node and a directly connected node within the topology of nodes, and
        determining that the connection between the node and the directly connected node is allowable according to the rule.

6. The method of claim 5, wherein the determining whether the connection between the node and the directly connected node is allowable further comprises:
    determining, based on the metagraph, a type for the node;
    determining, based on the metagraph, another type for the directly connected node; and
    determining, based at least in part on the metagraph, whether the type for the node is allowed to be connected to the other type for the directly connected node.

7. The method of claim 4, wherein the input describes an update to a particular node already within the topology of nodes, wherein the modifying comprises adding a direct connection between the particular node and a transitively reachable node already within the topology, and wherein a closure table record specifying a connection between the particular node and the transitively reachable node already exists in the closure table.

8. The method of claim 4, further comprising:
    receiving input to set one or more user permissions for modifying the topology of nodes
    updating one or more permission records for the topology of nodes, wherein the permissions records indicate different user permissions for different portions of the topology of nodes, and wherein the different portions of the topology of nodes correspond to respective subgraphs within the directed acyclic graph for the topology of nodes.

9. The method of claim 8, further comprising:
prior to the modifying the closure table:
    determining, based on the user permissions, that the user is allowed to update the connection between the node and the directly connected node.

10. The method of claim 4, further comprising:
identifying a portion of the topology of nodes affected by the modification to the topology of nodes, wherein the user does not have permission to directly update the portion of the topology of nodes; and
updating the closure table to reflect an update for the portion of the topology of nodes regardless of whether the user has permission to directly update the portion of the topology of nodes.

11. The method of claim 4, wherein the closure table is stored within a database, wherein direct and transitive connections of a directed acyclic graph representing the topology of nodes are represented in the closure table by a record for each connection specifying an ancestor node connected to a descendant node, wherein the closure table is indexed in the database by both ancestor nodes and descendant nodes such that a given closure table record may be located based on either an ancestor node identification or may be located based on a descendant node identification, and wherein an ancestor node points to a descendant node in the topology of nodes.

12. The method of claim 4, further comprising:
receiving a query regarding the topology of nodes;
determining, based at least in part on parameters of the query, a subset of closure table records consistent with the parameters of the query; and
determining, based on the subset of closure table records, a query response.

13. The method of claim 4, further comprising:
receiving a query regarding the topology of nodes, wherein the topology of nodes includes a node and a transitively reachable downstream node, and wherein the closure table includes a record specifying a connection between the node and the downstream node;
identifying, based at least in part on parameters of the query, the record specifying a connection between the node and the downstream node;
determining, based on the record specifying a connection between the node and the downstream node, a query response without recursing through nodes in the topology between the node and the downstream node.

14. The method of claim 4, further comprising:
receiving an update to the topology of nodes specifying that an existing node within the topology of nodes has been deleted; and
locating and deleting each record in the closure table indicating a connection to another node downstream from the node that has been deleted.

15. A non-transitory, computer-readable storage medium storing program instructions that, when executed on one or more hardware processors, implement a topology service configured to:
    receive input describing a modification to a topology of nodes, wherein the topology of nodes is represented by a closure table;
    determining one or more, new or existing, nodes or connections in the topology of nodes corresponding to the modification to the topology of nodes; and
    for each of the one or more, new or existing, nodes or connections in the topology of nodes, creating or modifying an entry in the closure table in accordance with the modification to the topology of nodes.

16. The non-transitory, computer-readable storage medium of claim 15, wherein the modification comprises an addition of a node into the topology of nodes, and wherein, to update the closure table, the topology service is configured to:

add a record in the closure table describing a direct connection between the node and an existing node in the topology of nodes; and add a record in the closure table describing a transitive connection for a given node in the topology of nodes transitively reachable from or to the node.

17. The non-transitory, computer-readable storage medium of claim 15, wherein the modification comprises a removal of a node from the topology of nodes, and wherein, to update the closure table, the topology service is configured to:

remove a record in the closure table describing a direct connection between the node and an existing node in the topology of nodes; and remove each record in the closure table describing a transitive connection for a given node in the topology of nodes transitively reachable from or to the node.

18. The non-transitory, computer-readable storage medium of claim 15, wherein the topology service is configured to:

receive a query regarding the topology of nodes;

determine, based at least in part on parameters of the query, a subset of closure table records consistent with the parameters of the query regarding the topology of nodes; and determine, based on the subset of closure table records, a response to the query regarding the topology of nodes.

19. The non-transitory, computer-readable storage medium of claim 15, wherein the modification includes an addition of a node into the topology of nodes, and wherein the topology service is further configured to:

prior to the update to the closure table:

access a metagraph to identify a rule corresponding to a connection between the node and a directly connected node within the topology of nodes, and determine whether the connection between the node and the directly connected node is allowable according to the rule.

20. The non-transitory, computer-readable storage medium of claim 19, wherein the topology service is further configured to:

determine, based on the metagraph, a type for the node;

determine, based on the metagraph, another type for a directly connected node; and determine, based at least in part on the metagraph, that the type for the node is allowed to be connected to the other type for the directly connected node.

* * * * *